(12) United States Patent
Kingston et al.

(10) Patent No.: US 6,230,492 B1
(45) Date of Patent: May 15, 2001

(54) ELECTRICALLY ACTUATED HYDRAULIC POWER CYLINDER

(75) Inventors: Andrew W. Kingston, Heidesheim; Salvatore Oliveri, Filsen; Robert L. Ferger, Homburg; Thomas Weigert, Bad Soden, all of (DE)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/257,317

(22) Filed: Feb. 25, 1999

Related U.S. Application Data (63) Continuation of application No. PCT/US97/14178, filed on Aug. 29, 1997.
(60) Provisional application No. 60/025,205, filed on Aug. 30, 1996.

(51) Int. Cl.$^7$ ........................................................ F15B 7/00
(52) U.S. Cl. ................................ 60/545; 60/588; 92/136; 92/31
(58) Field of Search ............................. 60/533, 545, 588; 91/61; 92/136, 31

(56) References Cited

U.S. PATENT DOCUMENTS

| | | | |
|---|---|---|---|
| 3,156,097 | * 11/1964 | Brown | 60/588 |
| 3,388,548 | 6/1968 | Vieths . | |
| 3,753,064 | 8/1973 | Agarwal et al. . | |
| 4,162,616 | 7/1979 | Hayashida . | |
| 4,653,815 | 3/1987 | Agarwal et al. . | |
| 4,756,391 | 7/1988 | Agarwal et al. . | |
| 4,914,917 | 4/1990 | Schonlau . | |
| 5,000,523 | 3/1991 | Mikhaeil-Boules et al. . | |
| 5,143,429 | 9/1992 | Higashimata et al. . | |
| 5,302,008 | 4/1994 | Miyake et al. . | |
| 5,484,193 | 1/1996 | Fuller et al. . | |
| 5,558,409 | 9/1996 | Walenty et al. . | |
| 5,667,283 | 9/1997 | Drennen et al. . | |
| 5,749,633 | 5/1998 | Baumgartner . | |

FOREIGN PATENT DOCUMENTS

| | | |
|---|---|---|
| 0 238 921 B1 | 10/1989 | (EP) . |
| 0 398 531 A1 | 11/1990 | (EP) . |
| 0 497 392 A1 | 8/1992 | (EP) . |
| 0 682 397 B1 | 11/1995 | (EP) . |
| 0 682 398 B1 | 11/1995 | (EP) . |

\* cited by examiner

*Primary Examiner*—Hoang Nguyen
(74) *Attorney, Agent, or Firm*—MacMillan, Sobanski & Todd, LLC (57) ABSTRACT

An electrically actuated hydraulic power cylinder for use in a vehicle braking system. The power cylinder includes an electric motor, a rotary-to-linear actuator for converting rotary motion of the electric motor to a linear motion, and a hydraulic cylinder. In a preferred embodiment, the rotary-to-linear actuator is a roller screw assembly. The roller screw assembly converts rotational motion generated by the motor into axial movement of a piston which is disposed within the hydraulic cylinder. The movement of the piston pressurizes a volume of fluid. The pressurized fluid flows through an outlet port connected to either a single wheel brake cylinder or a plurality of wheel brake cylinders, thereby actuating the associated wheel cylinder. In a specific embodiment of the invention, the roller screw assembly is incorporated into the internal structure of the motor for compactness and weight reduction. Also, the hydraulic cylinder may be integrated into a wheel brake assembly for compactness and weight reduction.

23 Claims, 4 Drawing Sheets

ELECTRICALLY ACTUATED HYDRAULIC POWER CYLINDER

CROSS REFERENCE TO RELATED APPLICATIONS

This application is a continuation of International Application No. PCT/US97/14178, which designated the United States. Nonprovisional International Application No. PCT/US97/14178, filed Aug. 29, 1997, claims the benefit of U.S. Provisional Application No. 60/025,205, filed Aug. 30, 1996.

BACKGROUND OF THE INVENTION

This invention relates in general to vehicle braking systems, and in particular to an electrically actuated hydraulic power cylinder for use in advanced vehicle braking systems Electric motors are convenient and well known devices for converting electrical power into motion. The rotary motion produced by electric motors can be converted into a linear motion, which is more useful in certain situations, in a number of ways. One actuator device which is known for converting rotary motion into linear motion is the spindle gear mechanism disclosed in U.S. Pat. No. 4,926,708 to Dietrich et al., the disclosure of which is incorporated by reference herein.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated when an operator of the vehicle depresses a brake pedal. Typically, the brake pedal is mechanically linked to a master cylinder of a hydraulic brake system. When the brake pedal is depressed, the master cylinder is operated to pressurize a volume of hydraulic fluid, and direct the pressurized hydraulic fluid via hydraulic brake lines to the brake assemblies at the wheel.

In order to increase the force with which the brake assemblies are applied, while keeping the force that the driver has to apply to a brake pedal at a reasonable value, various pneumatic or hydraulic booster mechanism have been developed to assist the driver in applying a force to the master cylinder.

More recently, the industry has been developing brake systems in which the brake pedal is not normally hydraulically connected to the brake assemblies. The driver does not supply any portion of the force actuating the brake assemblies. Instead, sensors are actuated when the brake pedal is depressed. These sensors generate a signal indicative of a desired amount of braking being demanded by the driver. This signal is input to a controller which controls operation of a electromechanical mechanisms which supply the force needed to actuate the brake assemblies. These electromechanical mechanism typically include an electrical motor driven pump supplying high pressure brake fluid to the brake assemblies through an arrangement of valves which are operated to regulate the pressure of the brake fluid supplied to the brake assemblies based upon the driver's brake demand signal. The driver's brake demand signal may be modified by the controller to accomplish such "intelligent" braking schemes as Antilock Braking (ABS), Traction Control (TC), Vehicle Stability Control (VSC), and Collision Avoidance (CA).

SUMMARY OF THE INVENTION

This invention relates in general to vehicle braking systems and in particular to an electrically actuated hydraulic power cylinder for use in such a vehicle braking system. The power cylinder includes an electric motor, a rotaryto-linear actuator for converting rotary motion of the electric motor to a linear motion, and a hydraulic cylinder. In a preferred embodiment, the rotary-to-linear actuator is a roller screw assembly, sometimes referred to as a roller spindle assembly. The roller screw assembly converts rotational motion generated by the motor into axial movement of a piston which is disposed within the hydraulic cylinder. The movement of the piston pressurizes a volume of fluid. The pressurized fluid flows through an outlet port connected to either a single wheel brake cylinder or a plurality of wheel brake cylinders, thereby actuating the associated wheel cylinder. In a specific embodiment of the invention the roller screw assembly is incorporated into the internal structure of the motor for compactness and weight reduction.

Various objects and advantages of this invention will become apparent to those skilled in the art from the following detailed description of the preferred embodiment, when read in light of the accompanying drawings.

DESCRIPTION OF THE INVENTION

Figures 1, 2:
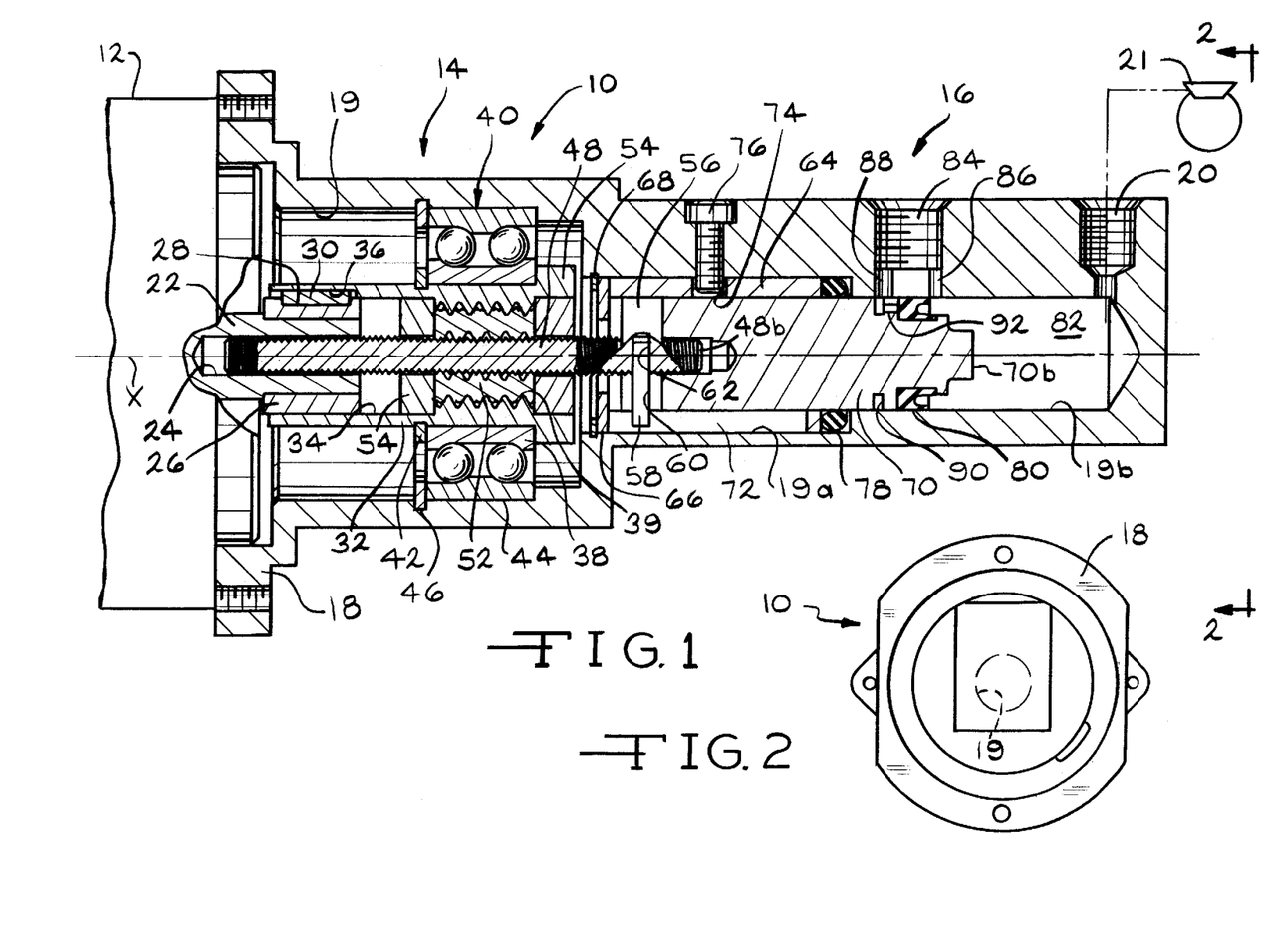
FIG. 1 is a partial sectional view of a first embodiment of a power cylinder in accordance with this invention, wherein the power cylinder is in a nonactuated position.
FIG. 2 is an elevational side view of the power cylinder taken along line 2—2 of FIG. 1.

Referring now to the drawings, there is illustrated in FIG. 1 a power cylinder, indicated generally at 10, in accordance with the invention, which can be incorporated into a vehicle braking system. The power cylinder 10 includes an electric motor 12 (shown partially broken away), a roller screw assembly 14, and a hydraulic cylinder 16. The power cylinder 10 includes a housing 18 having a multi-stepped bore 19 in which the roller screw assembly 14 and the hydraulic cylinder 16 are disposed. The motor 12 is secured to the housing 18 by suitable means, such as for example, by using threaded fasteners (not shown).

Broadly stated, the power cylinder 10 is electrically actuated to produce a hydraulic output. The roller screw assembly 14 converts the rotational motion of the electric motor 12 into axial motion to energize the hydraulic cylinder 16. The hydraulic cylinder 16 supplies pressurized fluid through an outlet port 20 formed in the housing 18 to a wheel brake cylinder, schematically represented at 21, to slow or stop the associated wheel of the vehicle. A separate power cylinder 10 can be provided at each respective wheel brake cylinder 21 of the vehicle. Alternatively, the vehicle can include a single power cylinder 10 which is operatively connected to more than one of the wheel brake cylinders 21. If a single power cylinder 10 is used to supply more than one on the wheel brake cylinders 21, appropriate valves may be used to regulate the pressure of the fluid supplied from the power cylinder 10 to the wheel brake cylinders 21 for various intelligent braking schemes, such as ABS, TC, CA, and VSC. If desired, the power cylinder 10 can be integrated within a brake caliper (not shown) of the wheel brake cylinder 21. The integration of the power cylinder 10 and the brake caliper would reduce the amount of hydraulic lines and connections required compared to mounting the power cylinder 10 remotely from the wheel brake cylinder 21. The hydraulic lines would be replaced with electrical lines which are generally less expensive than the hydraulic lines.

The motor 12 includes an output drive shaft 22 which extends into the bore 19 of the housing 18. The motor 12 can be any suitable type of motor, such as a conventional motor having brushes, a brushless motor, or a switched reluctance motor. The drive shaft 22 has a centrally located bore 24 which rotates about an axis X. A tubular bushing 26 is positioned over the drive shaft 22. The bushing 26 is coupled to the drive shaft 22 for rotation therewith by any suitable means, such as for example, by a press fit engagement. The bushing 26 has a keyway 28 which receives an inner portion of a key 30, the purpose of which will be explained below.

The roller screw assembly 14 is operatively coupled to the drive shaft 22 of the motor 12. The roller screw assembly 14 includes a generally cylindrical outer screw 32 having an opening 34 formed therethrough. The outer screw 32 has an internally notched keyway 36 which receives the outer portion of the key 30 to effectively couple the outer screw 32 to the bushing 26, and therefore to the drive shaft 22 for rotation therewith. The outer screw 32 further includes an internal threaded portion 39.

The outer screw 32 is rotatably supported in the housing 18 by a bearing assembly 40. The bearing assembly 40 includes an inner race 38 which is secured onto the outer surface of the outer screw 32 by suitable means, such as by a press fit engagement, and is retained on the outer screw 32 by a snap ring 42. An outer race 44 of the bearing assembly 40 is secured to the internal surface of the bore 19 of the housing 18 by suitable means, such as by a press fit engagement or a minimal clearance fit, and retained therein by a snap ring 46. The bearing assembly 40 bears both radial loads and thrust loads. Of course, many arrangements are available, and contemplated, which may be substituted for the bearing assembly 40 to deal with these radial and thrust loads.

The roller screw assembly 14 further includes an elongated externally threaded roller shaft 48 which is oriented along the axis X. In the illustrated embodiment, there is no contact between an end 48a of the roller shaft 48 and an end surface 24a of the central bore 24.

A plurality of externally threaded rollers 52 are disposed between the internally threaded portion 39 of the outer screw 32 and the externally threaded roller shaft 48 in a planetary gear-like arrangement. As will be described below, this arrangement is effective to convert the rotational motion of the outer screw 32 into axial movement of the roller shaft 48. A pair of roller guides 54 are disposed adjacent the ends of the rollers 52 to prevent axial movement thereof.

Figure 3:
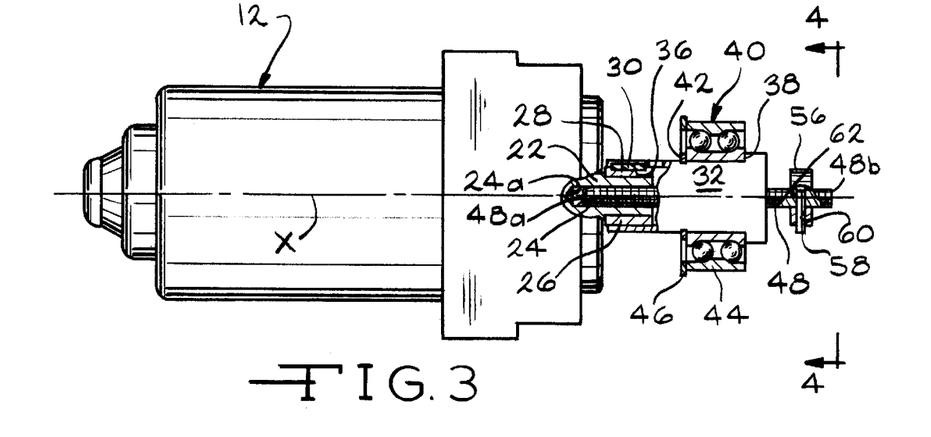
FIG. 3 is a partial sectional view of the motor and roller screw assembly of the power cylinder illustrated in FIG. 1.
Figure 4:
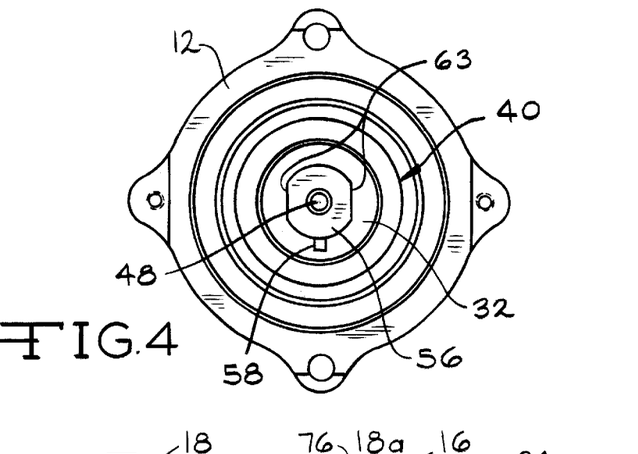
FIG. 4 is an elevational side view of the motor and roller screw assembly of the power cylinder taken along line 4—4 of FIG. 3.

An annular collar 56 is attached adjacent the opposite end 48b of the roller shaft 48, as shown in FIGS. 1 and 3. The collar 56 is rotatably coupled to the roller shaft 48 by a pin 58 which extends through a hole 60 formed through the collar 56 and through a hole 62 formed through the roller shaft 48. As best shown in FIG. 4, the collar 56 has wrench flats 63 for threadably installing the collar 56 onto the roller shaft 48.

Figure 5:
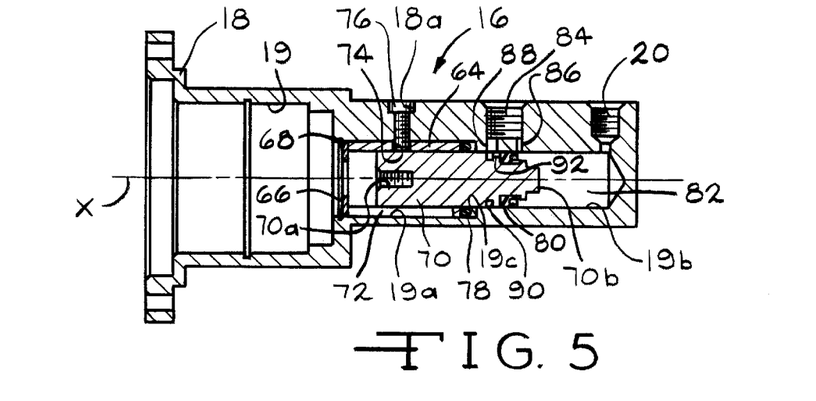
FIG. 5 is a partial sectional view of the hydraulic cylinder of the power cylinder illustrated in FIG. 1.

As shown in FIGS. 1 and 5, the hydraulic cylinder 16 includes a generally cylindrical bushing 64 which is disposed within a reduced diameter portion 19a of the bore 19 of the housing 18. The bushing 64 is retained in the housing 18 by a washer 66 and a snap ring 68. A generally cylindrical piston 70 is slidably disposed within the bushing 64 and a further reduced diameter portion 19b of the bore 19 of the housing 18. The reduced diameter portion 19b has a first end and a second end, with the first end being most adjacent the portion 19a. The piston 70 is selectively moved between a first position (retracted from the second end of the reduced diameter portion 19b of the bore 19) and a second extended position (adjacent the second end of the reduced diameter portion 19b of the bore 19) by the roller screw assembly 14. The piston includes a threaded portion 70a for threadably receiving the end 48a of the roller shaft 48. The bushing 64 includes a longitudinally extending slot 72 formed therein for receiving the pin 58 to allow axial movement of the roller shaft 48 relative to the bushing 64. The bushing 64 further includes an opening 74 formed therethrough which receives an end of a bolt 76 disposed in an opening 18a provided in the housing 18. The bolt 76 prevents rotational and axial movement of the bushing 64 relative to the housing 18. Thus, the bushing 64, the collar 56, and the roller shaft 48 are coupled together for axial movement relative to the housing 18 and restrained from rotational movement relative to the housing 18, for a purpose which will be explained below.

The hydraulic cylinder 16 further includes an elastomeric seal 78 disposed in portion 19a of the bore 19 between an end 64a of the bushing 64 and a shoulder 19c of the bore 19. As shown in FIGS. 1 and 5, a lip seal 80 is disposed near an end 70b of the piston 70 and engages a circumferential wall of the portion 19b of the bore 19 to define a sealed hydraulic chamber 82. The outlet port 20 communicates with the chamber 82. The housing 18 further includes an inlet port 84 formed therethrough to supply fluid from a reservoir (not shown) to the chamber 82 via a compensation port 86. The inlet port 84 further supplies fluid to an annular channel 90 formed in the piston 70 via a bleed port 88 formed through the housing 18. The lip seal 80 seals against the wall of the portion 19b between the bleed port 88 and the inlet port 84 when the piston 70 is in the first, retracted position thereof. The piston 70 further includes a small longitudinal passageway 92 formed therein to supply fluid from the channel 90 against the left side of the lip seal 80 when viewing FIGS. 1 and 5. The bleed port 88, the channel 90, and the passageway 92 provide means for "bleeding" the power cylinder 10. As shown in FIGS. 1 and 5, which illustrate the power cylinder 10 in the first position (not actuated), the compensation port 86 communicates with the chamber 82 at a relatively small distance to the right of the lip seal 80. Therefore, while the power cylinder 10 is in the non-actuated position, the inlet port 84 communicates directly with the outlet port 20.

When it is desired to actuate the vehicle brakes to slow or stop the associated wheels of the vehicle, the driver of the vehicle depresses a brake pedal (not shown). The depression of the brake pedal generates an electrical signal which is operative to actuate the power cylinder 10. The signal actuates the electric motor 12 causing rotation of the drive shaft 22, the outer screw 32, and the rollers 52. The rotation of the rollers 52 causes axial movement of the roller shaft 48 and the piston 70 to the right when viewing FIG. 1. Preferably, the roller screw assembly 14 has a relatively small overall pitch. A preferred range of pitch for the roller screw assembly 14 is such that one rotation of the motor 12 advances the piston 70 less than 5.0 millimeters (5.0 mm). More preferably the overall pitch of the roller screw assembly 14 is between 0.5 and 2.0 mm.

After the piston 70 has moved a sufficient distance, to the second position thereof, the lip seal 80 closes off the compensation port 86 to supply the pressurized fluid in the chamber 82 through the outlet port 20 to the associated wheel brake cylinder 21. If the power cylinder 10 were integrated into a single brake caliper, the swept volume of the chamber 82 of the hydraulic cylinder 16 is preferably sized to equate with the swept hydraulic volume within the brake caliper's cylinder. Note that the working area of the piston 70 and the bore 19 of the housing 18 can be dimensioned at a selected ratio with respect to the working area of the caliper piston (not shown) of the brake caliper to produce an appropriate hydraulic advantage. Although the invention has been illustrated and described with the particular compensation port 86 through the housing 18, other suitable compensation methods may be used, such as with a center port compensation structure.

When the driver releases the brake pedal, an electrical signal is generated to actuate the motor 12 in the opposite rotational direction causing the drive shaft 22, the outer screw 32, and the rollers 52 to rotate, thereby causing the piston 70 to move to the left when viewing FIG. 1. The movement of the piston 70 expands the chamber 82, thereby causing the withdrawal of fluid from the wheel brake cylinder 21.

Although the invention has been illustrated and described with reference to the particular roller screw assembly 14, disclosed herein, other arrangements for converting rotary motion to linear motion may be used. For example, instead of using the arrangement of the pin 58, the bushing 64 and the bolt 76, the roller shaft 48 can be prevented from rotational movement by any suitable means. Also note that various structures of the power cylinder 10 can be combined into a single structure. For example, the roller shaft 48, the collar 56, and the pin 58 could be a single structure. Likewise, the roller shaft 48 and the piston 70 could be combined into a single structure. Any suitable actuator structures for converting rotary motion into linear motion may be utilized, such as the spindle gear mechanism disclosed in the above mentioned U.S. Pat. No. 4,926,708 to Dietrich et al. Another actuator structure which may prove suitable for some applications is discussed in German patent application DE 19725372.5 (Gombert et al.). As further, non-exhaustive illustration of some of the types of actuator structures which are contemplated, it is believed that ball nut and screw actuators, planetary roller arrangements, and the like may be suitably employed in hydraulic actuators of the present invention to provide the desired overall pitch.

Figure 6:
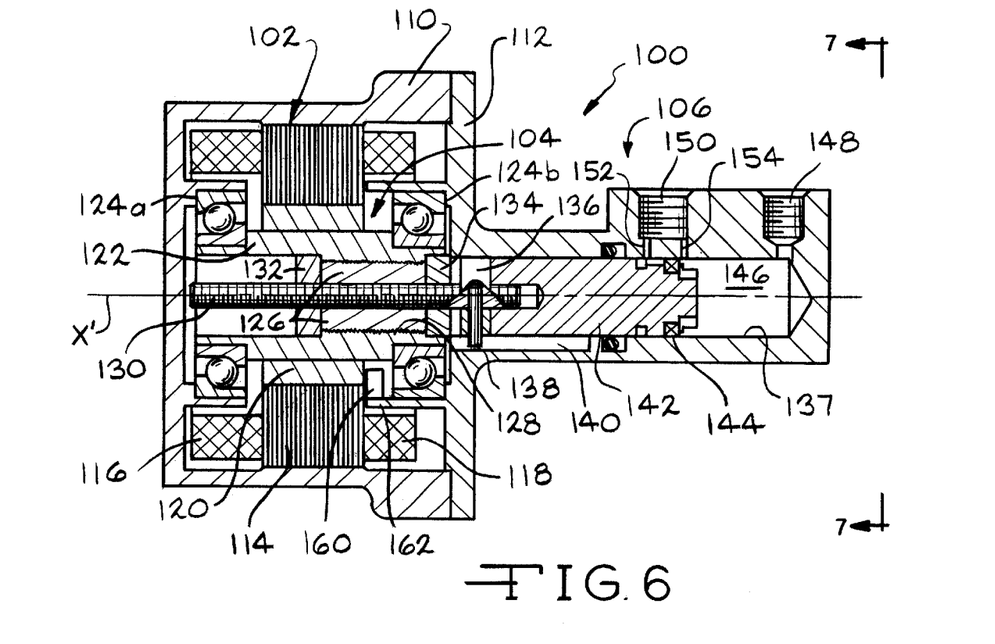
FIG. 6 is a sectional view of a second embodiment of a power cylinder in accordance with this invention, wherein the roller screw assembly is incorporated into the motor.
Figure 7:
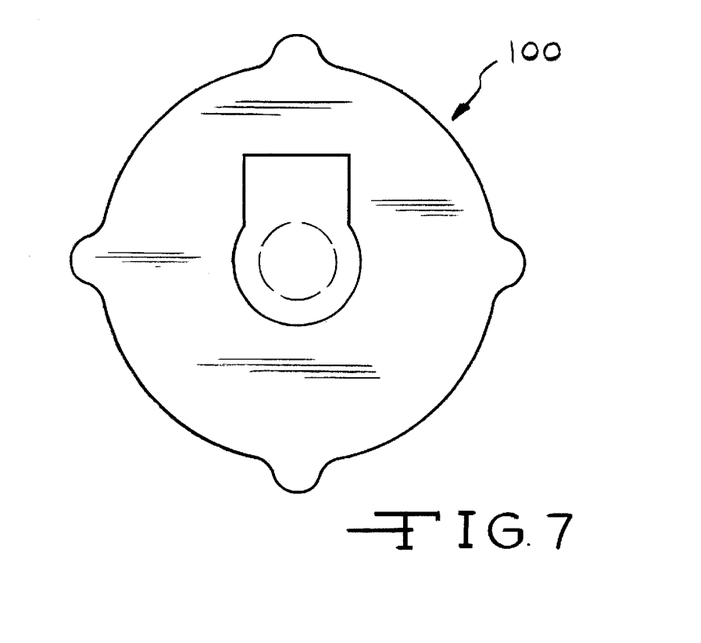
FIG. 7 is an elevational side view of the power cylinder taken along line 6—6 of FIG. 6.

FIGS. 6 and 7 illustrate a second embodiment of a power cylinder, indicated generally at 100, in accordance with this invention. The power cylinder 100 includes a motor assembly 102, a roller screw assembly 104, and a hydraulic cylinder 106. In this embodiment, the power cylinder 100 incorporates the roller screw assembly 104 into the motor 102. This helps too reduce the overall length and weight of the power cylinder 100. Also, a number of parts can be eliminated, such as the bearing assembly 40 and the drive shaft couplings used in the power cylinder 10, which further reduces the cost and weight of the power cylinder 100. As stated above with respect to the power cylinder 10 of FIG. 1 through 5, the power cylinder 100 can be integrated within a brake caliper of an associated wheel brake cylinder for further weight reductions.

The power cylinder 100 includes a motor housing 110 and a hydraulic housing 112 which is fastened to the motor housing 110 by suitable means, such as by threaded fasteners (not shown). The motor assembly 102 and the roller screw assembly 104 are disposed within the motor housing 110. The hydraulic cylinder 106 is similar in function and design to the hydraulic cylinder 16 of the power cylinder 10 illustrated in FIGS. 1 and 5.

The illustrated embodiment of the motor assembly 102 includes a stator 114, a pair of coils 116 and 118, and a plurality of magnets 120. Of course, it will be recognized that any suitable motor may be used, such as a conventional motor having brushes, a brushless motor, or a switched reluctance motor, and would not necessarily have the same components as the illustrated motor.

The roller screw assembly 104 is a planetary arrangement similar to the roller screw assembly 14 of FIG. 1, and includes an outer screw 122 which is supported in the housing 18 by a pair of bearing assemblies 124a and 124b. Of course, any suitable rotary motion to linear motion conversion device may be used. The bearing assemblies 124a and 124b are attached to the housing 110 and the outer screw 122 by suitable means, such as by a press fit engagement. The magnets 120 are attached to the outer surface of the outer screw 122 by suitable means, such as by an adhesive. The outer screw 122, therefore, acts as an output drive shaft of the motor assembly 102. The motor 102 assembly and the roller screw assembly 104 operatively rotate about a common axis X'.

The roller screw assembly 104 further includes a plurality of threaded rollers 126 which are positioned between an internal threaded portion 128 of the outer screw 122 and a threaded roller shaft 130. The rollers 126 are retained axially by a pair of ring-shaped roller guides 132 and 134. An annular collar 136 is attached to the roller shaft 130 and is disposed within a bore 137 of the hydraulic housing 112. The collar 136 is rotationally fixed to the roller shaft 130 by pin 138. The pin 138 extends into a longitudinal groove 140 formed in the hydraulic housing 112, thereby preventing rotational motion of the roller shaft 130. Note that the power cylinder 100 uses the groove 140 formed directly into the hydraulic housing 112, rather than using a slot in an intermediate part, such as the slot 72 formed in the bushing 64 of the power cylinder 10 of FIG. 1. The roller screw assembly 104 converts the rotary motion of the outer screw 122 into axial motion of the roller shaft 130 along the axis X' in the same manner as the roller screw 14 of the power cylinder 10 of FIG. 1.

The hydraulic cylinder 106 includes a piston 142 which is threadably connected to the roller shaft 130 and extends into a first end of the bore 137. The piston 142 is selectively moved between first and second positions in the bore 137 by the motor assembly 102 acting through the roller screw assembly. A lip seal 144 is mounted on the piston 142 and sealingly engages the inner surface of the wall of the hydraulic housing 112 which defines the bore 137. An expandable fluid chamber 146 is defined by the lip seal 144, the piston 142, and a closed second end of the bore 137 of the hydraulic housing 112. The chamber 146 communicates with an outlet port 148 formed through the hydraulic housing 112 at the second end of the bore 137. An inlet port 150, a bleed port 152, and a compensation port 154 are also formed in the hydraulic housing 112 and function the same as their counterparts in the power cylinder 10.

The power cylinder 100 generally functions in the same manner as the power cylinder 10 shown in FIGS. 1 through 5. To actuate the power cylinder 100, the motor 102 is electrically actuated causing rotation of the outer screw 122. The rotational motion of the threaded portion 128 of the outer screw 122 causes the threaded rollers 126 to rotate around the rotationally locked roller shaft 130 thus threading out the roller shaft 130. The roller shaft 130 and the collar 136 push the piston 142 along the axis X' in a rightward direction, as seen in FIG. 6, closing off the compensation port 154, and thus pressurizing the fluid in the chamber 146. The pressurized fluid travels through the outlet port 148 to the associated wheel brake cylinder 21. The working area of the piston 142 and the bore 137 of the hydraulic housing 112 are dimensioned at a selected ratio with respect to the working area of the caliper piston of the brake caliper to produce an appropriate hydraulic advantage. If the power cylinder 100 were integrated into a brake caliper as discussed above, the hydraulic fluid buffer between the working area of the piston 142 and the working area of the caliper piston would advantageously enable a simple, compact, and durable means for operatively connecting the motion of the piston 142 and the caliper piston at an appropriate ratio of movement.

The power cylinders 10 and 100 can be equipped with a sensor for measuring the rotation angle of their respective motor output shafts (drive shaft 22 and outer screw 122, respectively). Although either of the power cylinders 10 or 100 can be equipped with a sensor, for illustrative purposes only, the power cylinder 100 will be described as incorporating a sensor 160. Note a plurality of sensors 160 may also be used. The sensor 160 is disposed on a portion 162 of the motor housing 110 which is rotationally fixed and can be used as a fixed reference point. The sensor 160 is positioned axially adjacent the magnets 120. By sensing the passing of the rotating magnets 120, the rotation angle of the outer screw 122 with respect to a fixed reference point can be determined. By knowing the rotation angle of the outer screw 122, the axial position of the piston 142 can be determined. Since a change in brake pressure is a linear function of the axial position of the piston 142, the sensor 160, with the appropriate control logic, can be used to determine the brake pressure applied. The electrical signal actuating the motor assembly 102 can then be modified to alter the output of the motor assembly 102 to change the brake pressure as desired. Of course, any suitable arrangement can be incorporated into the power cylinders 10 and 100 to sense the axial movement of the pistons 70 and 142, respectively. For example, counting the excitation pulses of an electronically commutated motor will provide indication of relative axial position of the pistons 70 and 142.

Figure 8:
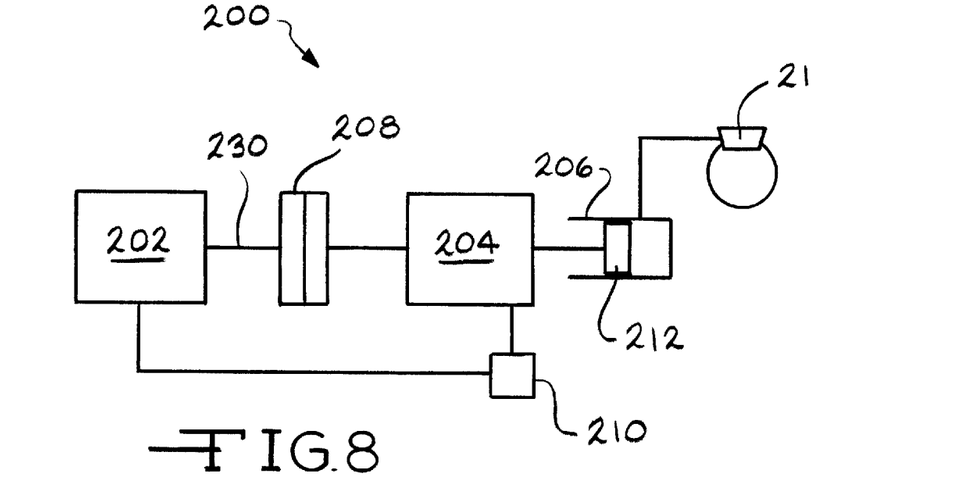
FIG. 8 is a schematic diagram of third embodiment of a power cylinder in accordance with this invention, wherein the power cylinder includes a clutch and a spring wrap brake.

FIG. 8 is a schematic diagram of a power cylinder 200, in accordance with this invention, which represents either the power cylinder 10 or 100. The power cylinder 200 has a motor 202, a roller screw assembly 204, and a hydraulic cylinder 206. The power cylinder 200 also includes a clutch 208 which couples and uncouples the drive shaft of the motor 202 to the roller screw 204. The power cylinder 200 further includes a spring wrap brake 210 which prevents back drive motion of the motor 202 when the power cylinder 200 is applying pressure to the wheel brake cylinder 21. In certain brake applications, it may be desirable to incorporate the clutch 208, the spring wrap brake 210, or the combination of the two into the power cylinder 200. Spring wrap brakes and clutches are well known in the art.

The clutch 208 is connected between the output of the motor 202 and the input of the roller screw assembly 204. When energized, the clutch 208 couples the motor 202 to the roller screw assembly 204 by frictional means which are well known in the art. For a power cylinder 200 which has the roller screw 204 directly coupled to the motor 202, the inertia of all the components in the roller screw 204 hinders the initial start-up speed of the motor 42. The inertia of these components causes a lag-time during start-up and stopping of the rotation of the motor 202, and also between forward rotation and immediate backward rotation of the motor 202. The use of the clutch 208 is advantageous because it can initially reduce the rotational inertia of mass to increase the start-up time of the motor 202 and decrease the lag-time. This reduction in lag-time is especially desirable for actuating a power cylinder 200, which is incorporated into an antilock braking system. For example, during an anti-lock brake system event, the braking force is generally rapidly cycled to reapply and relieve pressure to the wheel brake cylinder 21 to limit wheel slippage while continuing to adequately decelerate the vehicle.

To actuate the power cylinder 200 incorporating the clutch 208, an electrical signal actuates the motor 202 to bring the motor 202 up to a desirable operating speed. The clutch 208 is then engaged to operatively couple the motor 202 to the roller screw assembly 204 which imparts axial motion to a piston 212 within the hydraulic cylinder 206 in the same manner as described above with respect to the power cylinders 10 and 100. To deenergize the hydraulic cylinder 206, the clutch 208 is deenergized thereby uncoupling the motor 202 from the roller screw 204. Although the motor 202 may still be rotating, there is no further braking force applied while the clutch 208 is deenergized. If the clutch 208 is then energized again, the rotational motion of the motor 202 is imparted as an axial motion to the piston 212 to energize the hydraulic cylinder 206. The reenergizing of the clutch 208 decreases the start-up lag-time because the motor 202 is already rotating. Although the clutch 208 is shown coupling the motor 202 to the roller screw assembly 204, the clutch 208 can be incorporated anywhere in the power cylinder 200 to couple and uncouple two operatively connected rotating members, such as internal structures of the motor 202 or the roller screw assembly 204.

Under certain applications it may be desirable to have a mechanism, such as the spring wrap brake 210, which prevents back drive motion of the motor 202 of the power cylinder 200. For example, it may be desirable to terminate the power in the electric motor 202 yet maintain a constant hydraulic braking force applied to the wheel brake cylinder 21. The spring wrap brake 210 when actuated prevents the rotational components in the roller screw assembly 204 from rotating, thus preventing the pressure acting against the piston 212 from driving the piston 212 backward and causing a loss in pressure. The spring wrap brake 210 is shown schematically in FIG. 8 engaging the roller screw assembly 204 and the motor 202, however, the spring wrap brake 210 can be operatively engaged with any rotating member of the power cylinder 200.

Figure 9:
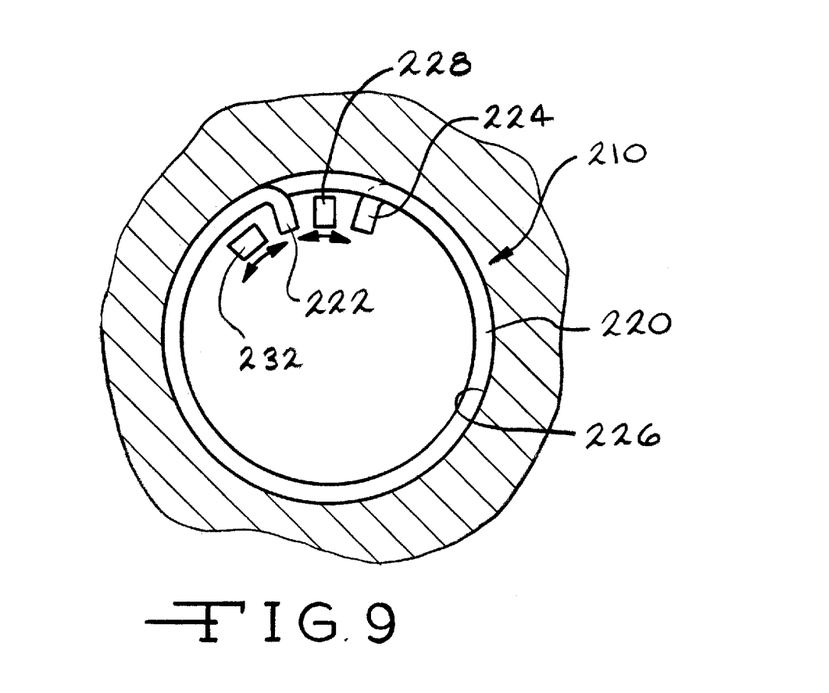
FIG. 9 is a schematic view of the spring wrap brake.

FIG. 9 is a more detailed schematic view of the spring wrap brake 210. The spring wrap brake 210 includes a helical wire spring 220 having two tangs 222 and 224 which are formed by bending the ends of the spring wire. When the spring 220 is in its relaxed state, the spring 220 expands outwardly and frictionally engages a fixed cylindrical surface 226 (such as a portion of the housing 18 or 110 of the power cylinders 10 and 100, respectively). The spring wrap brake 210 further includes an output member 228 which is attached or incorporated onto the roller screw assembly 204 so that rotation of the roller screw assembly 204 rotates the output member 228. The spring wrap brake 210 also includes an input member 232 which is attached or incorporated onto a drive shaft 230 of the motor 42, shown in FIG. 8, so that actuation of the motor 202 rotates the input member 232. The spring wrap brake 210 embodiment shown in FIG. 9 operates in either rotational direction.

For operation of the power cylinder 200 incorporating the spring wrap brake 210, the motor 202 is actuated causing rotation of the input member 232. The input member 232 rotates until it contacts and pushes on either the tang 222 or the tang 224, depending on the direction of rotation, causing contraction of the spring 220, thereby disengaging the frictional contact between the spring 220 and the cylindrical surface 226. After a small rotation the tang 222 or 224 contacts the output member 228 causing rotation of the roller screw assembly 204, thereby actuating the power cylinder 200. When the motor 202 is deenergized, the rotation of the input member 232 will be terminated, thus removing the force being applied to the tang 222 or 224 causing the spring 220 to expand outwardly to frictionally engage the cylindrical surface 226. Any axial reactionary force causing the roller screw assembly 204 to rotate causes the output member 228 to rotate a small amount until contact is made with either the tang 222 or 224. The pushing of the tang 222 or 224 will cause the spring 220 to expand outwardly to frictionally engage the cylindrical surface 226, thus preventing back drive motion of the motor 202.

In summary, the power cylinders disclosed herein have numerous advantages over conventional power cylinders. The three main sub-assemblies (electric motor, roller screw assembly, and the hydraulic cylinder) of the power cylinders of the present invention each generally operate about the same axis. By being in alignment with a single axis, a fewer number of bearing structures are needed, which saves weight, space, and overall cost of the power cylinders. The power cylinder 100, in particular, incorporates the electric motor and the roller screw assembly into a single structure, which helps reduce the number of parts.

The power cylinder 200 of the present invention incorporates a clutch which provides for a relatively fast actuation time, thus providing an advantage over conventional power cylinders. The power cylinder 200 also includes a spring wrap brake which prevents rotational movement of the roller screw assembly when the spring wrap brake is in the non-actuated position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A power cylinder, comprising:
   a motor;
   a roller screw assembly including:
      an outer screw which rotates about an axis and is operatively connected to said motor, said outer screw having an internal threaded portion;
      a shaft oriented along said axis, said shaft having an outer threaded portion; and
      a plurality of rollers threadably engaging said threaded portion of said shaft and said internal threaded portion of said outer screw, wherein said roller screw assembly converts rotary motion of said outer screw into axial motion of said threaded shaft in a direction along said axis; and
   a hydraulic cylinder including a housing having a bore therein and oriented along said axis, said hydraulic cylinder further including a piston disposed within said bore and operatively connected to said shaft of said roller screw assembly, said bore and said piston defining a fluid chamber, wherein axial motion of said shaft moves said piston within said bore causing expansion or contraction of said fluid chamber depending on the direction of movement of said piston.

2. The power cylinder of claim 1 further including a sensor which measures the rotation angle of the outer screw with respect to a fixed non-rotating reference point.

3. The power cylinder of claim 1 further including a clutch which operatively couples and uncouples said motor from said outer screw of said roller screw assembly.

4. The power cylinder of claim 1 further including a spring wrap brake operable to an actuated position and a non-actuated position, wherein said spring wrap brake prevents rotational movement of said roller screw assembly when said spring wrap brake is in said non-actuated position.

5. The power cylinder of claim 1 further including electronic means for determining the axial position of said piston.

6. The power cylinder of claim 5 wherein said means includes a mechanism for counting electrical pulses to said motor.

7. An electrically actuated hydraulic power cylinder, comprising:
   a hydraulic fluid reservoir;
   a hydraulic cylinder housing having an inner wall defining an axial bore in said hydraulic cylinder housing, said bore having a first end, a second end and an intermediate portion defined between said first end and said second end of said bore, said hydraulic cylinder housing further defining an outlet port adapted to provide fluid communication between said second end of said bore and a wheel brake assembly piston, and a bleed port providing fluid communication between said reservoir and said first end of said bore;
   a piston reciprocably disposed in said bore to move between a first axial position in said bore adjacent said first end of said bore and a second axial position in said bore adjacent said second end of said bore;
   an inlet port defined in one of said piston and said hydraulic cylinder housing to providing fluid communication between said reservoir and said intermediate portion of said bore;
   a seal mounted on said piston in sealing engagement therewith and in sliding engagement with said hydraulic cylinder housing wall, said seal mounted to prevent fluid flow from said second end of said bore past said seal to said first end of said bore and to permit fluid flow from said first end of said bore past said seal to said second end of said bore, said seal engaging said hydraulic cylinder housing wall between said bleed port and said intermediate portion of said bore when said piston is in said first position with said inlet port operable to permit free fluid communication between said reservoir and said second end of said bore through said inlet port, said seal engaging said hydraulic cylinder housing wall between said inlet port and said outlet port when said piston is in said second position to prevent fluid communication from said second end of said bore to said reservoir, said seal and said piston adapted to cooperate with said hydraulic cylinder housing to pressurize fluid contained in said second end of said bore and urge the fluid out of said outlet port when said piston is advanced from said first position to said second position; and an electrical motor operatively connected to said piston to selectively move said piston between said first position and second position.

8. The hydraulic power cylinder of claim 7, further including a rotaryto-linear actuator for converting rotary motion of said motor to linear motion of said piston.

9. The hydraulic power cylinder of claim 8 wherein said rotary-to-linear actuator is a roller screw arrangement for converting rotary motion of said motor to linear motion of said piston.

10. The hydraulic power cylinder of claim 7 wherein said hydraulic cylinder housing defines an axial groove, and said piston is constrained against rotation by pin fixed to said piston and engaging said groove defined in said hydraulic cylinder housing.

11. The hydraulic power cylinder of claim 8 wherein said hydraulic cylinder housing includes a sleeve disposed within said bore, said sleeve being fixed relative to said wall of said bore, said groove of said hydraulic cylinder housing being defined in said sleeve of said hydraulic cylinder housing.

12. The hydraulic power cylinder of claim 8 wherein said rotary-to-linear actuator has an overall pitch of less than 5 millimeters.

13. The hydraulic power cylinder of claim wherein said rotary-to-linear actuator has an overall pitch in the range of 0.5 millimeters to 2 millimeters.

14. The hydraulic power cylinder of claim 9 wherein said roller screw arrangement comprises:

an outer screw rotatably supported relative to said hydraulic cylinder housing, said outer screw having an axially extending bore formed therethrough, said axial bore of said outer screw having threads formed therein, said outer screw being operatively coupled to said motor for rotation therewith;

a roller shaft operatively coupled to said piston far axial movement therewith, said roller shaft having an external thread formed thereon, said roller shaft being disposed coaxially in said bore formed through said outer screw, said roller shaft being constrained against rotation relative to said hydraulic cylinder housing; and a plurality of externally threaded rollers disposed between said outer screw and said roller shaft, said rollers cooperating with said threads of said outer screw and said roller shaft to convert rotary motion of said outer screw to axial motion of said roller shaft.

15. The hydraulic power cylinder of claim 14 wherein said hydraulic cylinder housing defines an axial groove, and said piston is constrained against rotation by pin fixed to said piston and engaging said groove defined in said hydraulic cylinder housing, said roller shaft being fixed to said piston to constrain said roller shaft against rotation relative to said hydraulic cylinder housing.

16. The hydraulic power cylinder of claim 9 wherein said roller screw assembly is annularly disposed within said motor.

17. The hydraulic power cylinder of claim 8 further including a spring wrap brake operable to prevent movement of said rotary-to-linear actuator unless said motor is operated.

18. The hydraulic power cylinder of claim 7 further including a sensor generating a signal indicative of the position of said piston.

19. The hydraulic power cylinder of claim 18 wherein said sensor monitors operation of said motor to develop said signal.

20. The hydraulic power cylinder of claim 7 wherein said motor is operatively coupled to said piston through a clutch, said clutch being selectively operable to permit said motor to rotate without moving said piston.

21. The hydraulic power cylinder of claim 7 wherein said inlet port is formed through said hydraulic cylinder housing between said first end of said bore and said second end of said bore.

22. The hydraulic power cylinder of claim 14 further including a sensor monitoring rotation of said outer screw to generate a signal indicative of the position of said piston.

23. The hydraulic power cylinder of claim 7 further including a plurality of magnets operatively coupled to said piston such that said magnets move in proportion to movement of said piston and a sensor sensing relative movement between said sensor and said magnets to develop a signal indicative of the position of said piston.

\* \* \* \* \*

UNITED STATES PATENT AND TRADEMARK OFFICE
CERTIFICATE OF CORRECTION

PATENT NO. : 6,230,492 B1
DATED : May 15, 2001
INVENTOR(S) : Andrew W. Kingston, et al.

It is certified that error appears in the above-identified patent and that said Letters Patent is hereby corrected as shown below:

Column 11, claim 8,
Line 2, delete "rotaryto-linear" and insert -- rotary-to-linear --.

Column 11, claim 13,
Line 1, after "claim" insert -- 12 --.

Column 11, claim 14,
Line 9, delete "far" and insert -- for --.

Signed and Sealed this

Twenty-seventh Day of November, 2001

Attest:

*Attesting Officer*

NICHOLAS P. GODICI
*Acting Director of the United States Patent and Trademark Office*